(12) United States Patent
Tufari

(10) Patent No.: US 9,484,730 B2
(45) Date of Patent: Nov. 1, 2016

(54) ANCHORING CLAMP ON BUNDLE WIRES FOR HIGH-VOLTAGE ELECTRIC LINES AND DAMPENING SPACER PROVIDED WITH SUCH CLAMP

(71) Applicant: A. SALVI & C. S.p.A., Milan (IT)

(72) Inventor: Aldo Tufari, Milan (IT)

(73) Assignee: A. SALVI & C. S.p.A., Milan (IT)

(*) Notice: Subject to any disclaimer, the term of this patent is extended or adjusted under 35 U.S.C. 154(b) by 0 days.

(21) Appl. No.: 14/768,879

(22) PCT Filed: Feb. 20, 2013

(86) PCT No.: PCT/IT2013/000053
§ 371 (c)(1),
(2) Date: Aug. 19, 2015

(87) PCT Pub. No.: WO2014/128734
PCT Pub. Date: Aug. 28, 2014

(65) Prior Publication Data
US 2016/0006231 A1   Jan. 7, 2016

(51) Int. Cl.
*H02G 7/12* (2006.01)
*H02G 1/04* (2006.01)
*H02G 7/05* (2006.01)

(52) U.S. Cl.
CPC .................. *H02G 7/12* (2013.01); *H02G 1/04* (2013.01); *H02G 7/053* (2013.01); *H02G 7/125* (2013.01)

(58) Field of Classification Search
USPC .......................................... 174/40 CC, 41, 42
See application file for complete search history.

(56) References Cited

U.S. PATENT DOCUMENTS

| 4,053,706 A | * | 10/1977 | Houston | H02G 7/12 174/149 R |
| 4,892,275 A | * | 1/1990 | Szegda | H02G 7/12 248/61 |
| 5,801,336 A | * | 9/1998 | Blanding | H02G 7/20 174/146 |

FOREIGN PATENT DOCUMENTS

| BE | 486072 | 11/1948 |
| FR | 2961032 | 12/2011 |
| GB | 2079543 | 1/1982 |

\* cited by examiner

*Primary Examiner* — Dhirubhai R Patel
(74) *Attorney, Agent, or Firm* — Bay State IP, LLC

(57) ABSTRACT

The present invention relates to a clamp and a spacer for bundle-shaped wires of high-voltage electric lines, as well as a relative mounting kit. The clamp possesses an arm for fastening to wires, at the free end of which two fixed jaws are formed. The second jaw being movable through disengageable tightening means, both jaws being provided with opposite saddles for the housing of wire, wherein the second moving jaw has a first end mounted rotating on a pin, carried by said fastening arm in a position coinciding with a first end of the first jaw. The tightening includes a tie rod having an end mounted rotating on the jaw and a distal end constrained through a constraint pin to a cam lever.

10 Claims, 5 Drawing Sheets

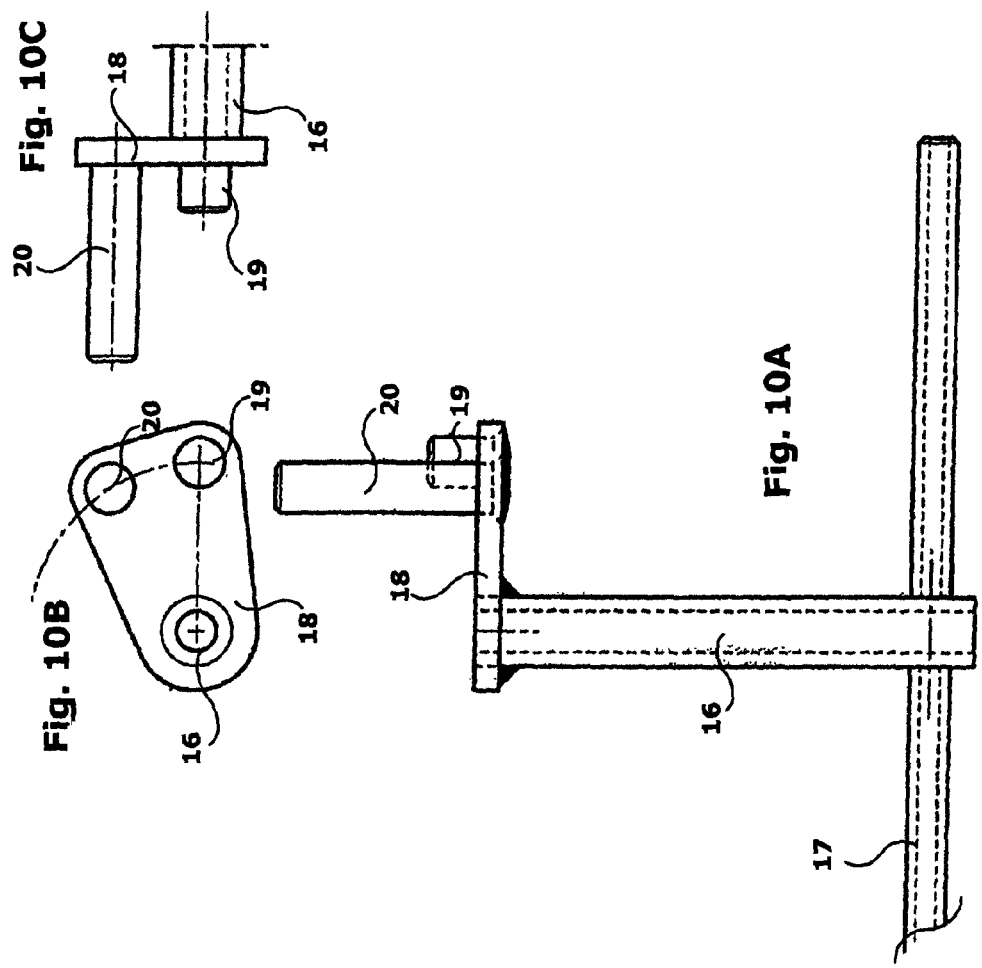
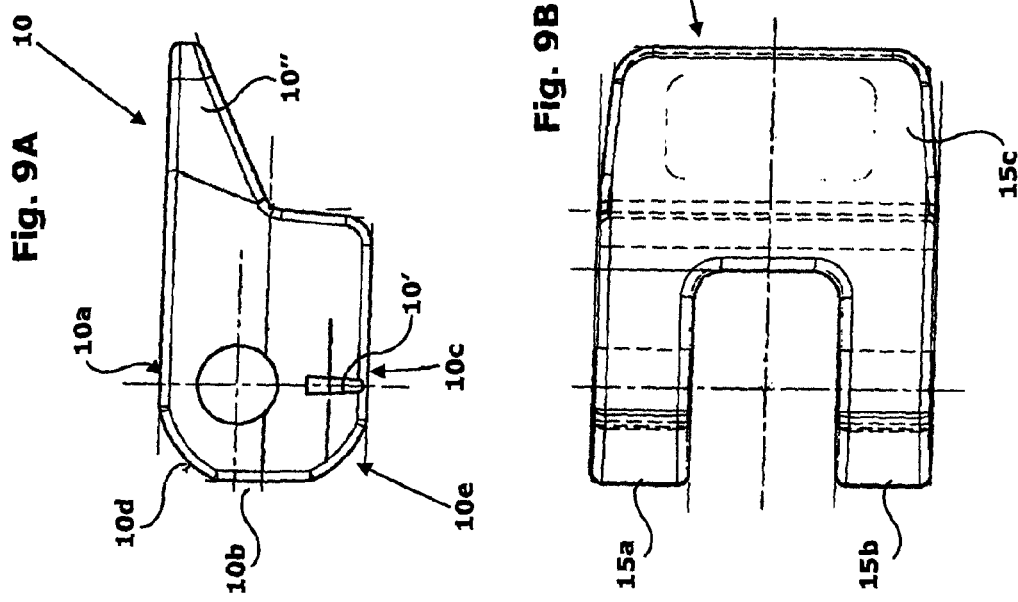

ANCHORING CLAMP ON BUNDLE WIRES FOR HIGH-VOLTAGE ELECTRIC LINES AND DAMPENING SPACER PROVIDED WITH SUCH CLAMP

CROSS REFERENCE TO RELATED APPLICATION

This application is for entry into the U.S. National Phase under §371 for International Application No. PCT/IT2013/000053 having an international filing date of Feb. 20, 2013, and from which priority is claimed under all applicable sections of Title 35 of the United States Code including, but not limited to, Sections 120, 363, and 365(c).

INVENTION BACKGROUND

The present invention concerns the spacer sector and, specifically, the sector of dampening spacers for high-voltage electric lines and, more precisely, electric lines which use bundle wires. More precisely, the invention relates to the structure of the anchoring clamps by which said spacer is fastened to the wires of the bundle.

STATE OF THE PRIOR ART

As known, aerial electric lines represent by far the most used case of long-distance power lines. They comprise a plurality of wires stretched between support posts. Normally, especially for higher-voltage long-distance power lines, each line wire consists of a bundle of elementary cables or wires, because that allows to increase the transmissible power, limiting dispersions and interfering electromagnetic fields. The most commonly used bundles consist of two, three or four elementary cables.

As known, the individual wires of the bundle must be kept at the correct mutual distance, along the entire span between a support post and the next. For such purpose, it is normally resorted to so-called "spacer" devices, built in various ways depending on the number of wires which make up the bundle. In general, these spacers have a structure which comprises a rigid central body, from which anchoring arms project radially—as many as the wires of the bundle—the free ends of which carry clamps shaped so as for each one to be able to engage with and tighten on an individual wire.

Preferably, said anchoring arms are not rigidly fastened to the central body, but rather by hinge means. In the case of the dampening spacers, said hinge means integrate an elastic structure with dampening capabilities of the rotation. The dampening spacers are useful to address possible oscillations caused by the wind on the individual wires.

A known arrangement of this type is the one illustrated in patent application PCT/IT2011/000424 in the name of the same Applicant.

In general, in known-art spacers, the clamp by which the anchoring arms fasten to the wires is made up of two portions, which are tightened one on the other—placing in between the wire—by means of bolts and nuts; in order to make sure that, on the one hand, the tightening is secure and there is no risk of clamp loosening due to the stresses it undergoes but, on the other hand, the tightening is not so forced to risk causing damages to the wire, the tightening operation is carried out by means of dynamometric wrenches.

This way of operating certainly represents the simplest, most immediate and cheapest solution within the reach of the person skilled in the field; it furthermore allows to give the tightening a certain adjustability, depending on working conditions. However, it is a solution which, on the one hand, offers a useless advantage, due to the fact that the opportunity of adjusting the tightening is not normally required, since the spacer clamps must all be tightened at a torque preset in the designing phase and, on the other hand, even thinking that the mounting and tightening work must be carried out on the building site, has a plurality of drawbacks, among which the need to employ special dynamometric wrenches.

A loosening of the grip on the wire may be caused by a number of possible variables, some of them connected to human error, others caused by unforeseeable and inevitable phenomena.

The causes can be:
poor mounting or assemblying
poor design
unscrewing
oscillations due to sub-span/Aeolian vibrations
wire sliding/ageing
the accidental entry of dirt between nuts and bolts alters the tightening torque and increases the chances of loosening of the tightening, which may lead to wear/collapse of the wire. Wire release (sliding) in general accounts for 20-30% of all causes of wire damage (see in this respect CIGRE Group B2.11, technical brochure 277).

The effects of these causes may be:
premature failure of the dampening spacer
unforeseeable vibration mode, due to the modified structure
increase of the width/stress on the wire
costly line maintenance In order to overcome, at least in part, these challenges, it is essential for the staff who performs the tightening to be particularly qualified, precisely according to:
on the one hand, the use of dynamometric wrenches;
on the other hand, particularly severe, if not extreme, conditions in which the tightening operation is performed; it must be remembered that work is carried out at remarkable heights from the ground, normally several dozens of meters, on supports subject to oscillations due to the wind.

Moreover, the work is—by its nature and due to the mentioned critical work conditions—particularly long, delicate and difficult, also because the operator must bring into coupling separate pieces; even in the case in which the two parts of each clamp are pre-assembled with the corresponding bolts, when they must be fastened on the wire running along the line, the operator must firstly separate and then reassemble these parts on the wire, before tightening them one on top of the other.

Finally, precisely these difficult working conditions inevitably carry the risk of a non fully even tightening on all the wires of the electric line, and it is virtually impossible to check the correctness of the work carried out on all anchoring clamps. This is the further reason why the work must be carried out by a qualified operator who has available all the time necessary for a perfect assemblying.

Problem and Brief Description of the Invention

The problem at the basis of the invention is hence to propose a structure of an anchoring clamp structure and of a corresponding dampening spacer which overcomes the mentioned drawbacks, connected in particular to the loosening of the tightening of the clamps on the wire, and which allows a quick and facilitated mounting as well as an even tightening of the anchoring clamps on the entire line.

BRIEF DESCRIPTION OF THE INVENTION

This object is achieved through the features mentioned in claim 1. The dependent claims describe preferred features of the invention.

In particular, according to a first aspect of the invention, a tightening clamp is provided for the fastening to wires of high-voltage electric lines, of the type comprising at least an arm fastening to the wires, at the free end of which there is formed a first fixed jaw, with which a second moving jaw is coupled by means of detachable tightening means, both jaws being provided with opposite saddles for the housing of a wire, wherein said second moving jaw has a first end rotatingly mounted on a pin, carried by said fastening arm in a position coinciding with a first end of the first jaw, while with a second end it is apt to cooperate with tightening means, said tightening means comprise a tie rod having a proximal end rotatingly mounted on the second end of the second jaw and a distal end constrained by means of a constraint pin to a cam lever, elastic means in the shape of at least one Belleville washer being mounted on said tie rod and arranged so as to lie between said cam lever and a fixed abutment element projecting from said fastening arm.

According to a preferred aspect, the elastic means consist of an assembly of at least two pairs of specularly opposite Belleville washers.

Another aspect of the invention provides that the elastic means are mounted freely sliding on the tie rod and arranged between two resting washers meant to rest against the fixed abutment element and against the shaped surface of the cam lever, respectively.

According to a further aspect the fixed abutment element consist of prongs of a fork projecting from the fastening arm.

According to an even further aspect, the cam lever is rotatingly mounted on a pin carried by the distal end of the tie rod and having a cam surface, on which the elastic means rest, said cam surface being shaped with a mixtilinear profile. Preferably the mixtilinear profile of the cam comprises at least two planar portions of resting surface of said elastic means, one portion making up a point of minimum and the other portion making up a point of maximum. More preferably the mixtilinear cam profile comprises a third intermediate planar portion of resting surface, which determines a minimal compression of said elastic means apt to stabilise clamp closing. The planar portions are preferably connected by curved portions.

A further aspect of the invention provides for the cam lever to be shaped as a fork body having two prongs, each one provided with a cam-shaped surface, said prongs being connected in an appendix forming a common actuation base.

According to a different aspect of the invention, a spacer for bundle wires of a high-voltage electric line is provided, of the type comprising a rigid central body, on which at least two arms for the fastening to the bundle wires are mounted, at the free end of each arm a clamp for the anchoring to a respective wire being associated, which is as indicated above.

Finally, according to a further aspect of the invention, an installation kit for a spacer as mentioned above is also provided, comprising a manoeuvring wrench consisting of a shaft with which, on the one side, an actuation bar is integral on one side and a support plate of two gripping pegs is integral on the other side, said two pegs being parallel to and offset with respect to said shaft and meant to engage with said appendix of the cam lever in a final tightening step.

Due to the particular configuration of the invention, the proposed spacer clamp not only has such a simplicity of the tightening system as not to require the intervention of experienced staff, but furthermore allows to eliminate the limits typical of a bolt tightening, since the tightening occurs with an "on/off" system, the features of which are calibrated during designing and manufacturing, and remain perfectly even on the entire line and for an indeterminate period of time. It must furthermore be highlighted that, in order to take into account the fact that the "on/off" system, in a metal-on-metal coupling, once the fastening has occurred, no longer allows possible "corrective actions" (which actions are related for example to the fact that the wire settles, increasing or reducing the diameter thereof, due to the temperature, to overloads or else), the tightening value is determined by the use of Belleville washers, which hence serve as "energy storage" so as to accumulate a force which may be returned (in the form of displacement) if and when needed, to accomplish in practice an automatic adjustment to these possible variations.

BRIEF DESCRIPTION OF THE DRAWINGS

Further features and advantages of the invention are in any case better evident from the following detailed description of a preferred embodiment, given purely as a non-limiting example and illustrated in the attached drawings, wherein:

FIGS. 9A and 9B are front elevation and top plan views, respectively, of a tightening cam lever according to the invention; and FIGS. 10A, 10B and 10C represent a top plan view, an elevation front view and a partly-interrupted elevation side view, respectively, of a manoeuvring wrench to be employed with a clamp according to the invention.

DETAILED DESCRIPTION OF THE PREFERRED EMBODIMENT

Figure 1A:
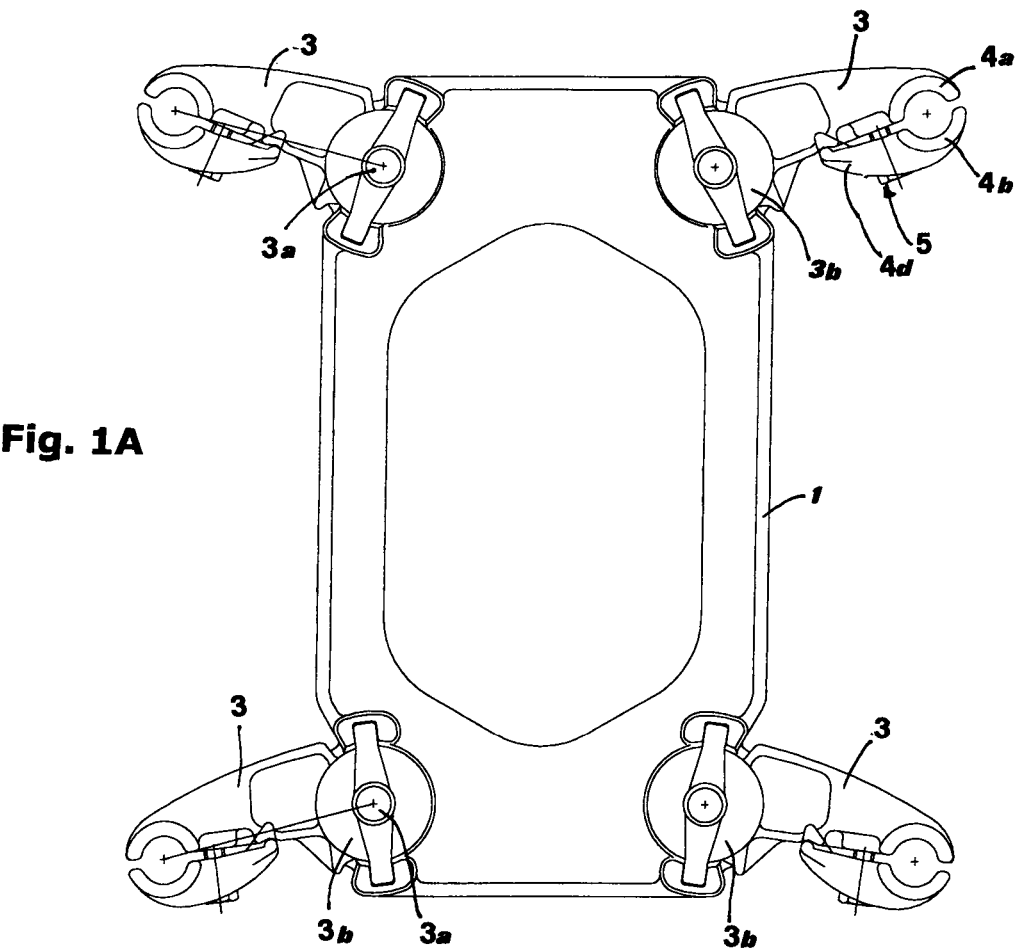
FIG. 1A is a front elevation schematic view of a dampening spacer with four arms and corresponding tightening clamps of the prior art.
Figure 1B:
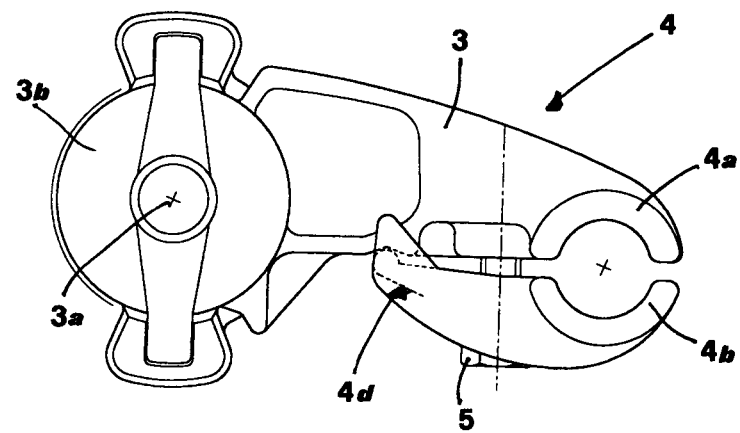
FIG. 1B is an enlarged view of one of the arms of the spacer of FIG. 1A.

FIGS. 1A and 1B show, in an elevation view, a dampening spacer according to the prior art. It is a spacer for 4-strand bundle, comprising a rigid central body 1, on which oscillating arms 3 are hinged, each one through a pin 3a and dampening means 3b (not shown in detail, being well-known) which accomplish a dampening of the oscillations induced on arms 3 by the action of the electric line wires.

FIG. 1B shows well the structure of clamp 4 tightening on the wire (not shown), which implies, for each one of arms 3, a pair of jaws, of which a first one, referred to as 4a, is integral with arm 3 and a second one, referred to as 4b, makes up a separate piece but mounted moving with respect to the first one. The two jaws 4a and 4b are associated by means of a bolt 5 and a guiding tooth 4d. This construction is anyhow well-known and no further explanation is deemed necessary here.

Figure 2:
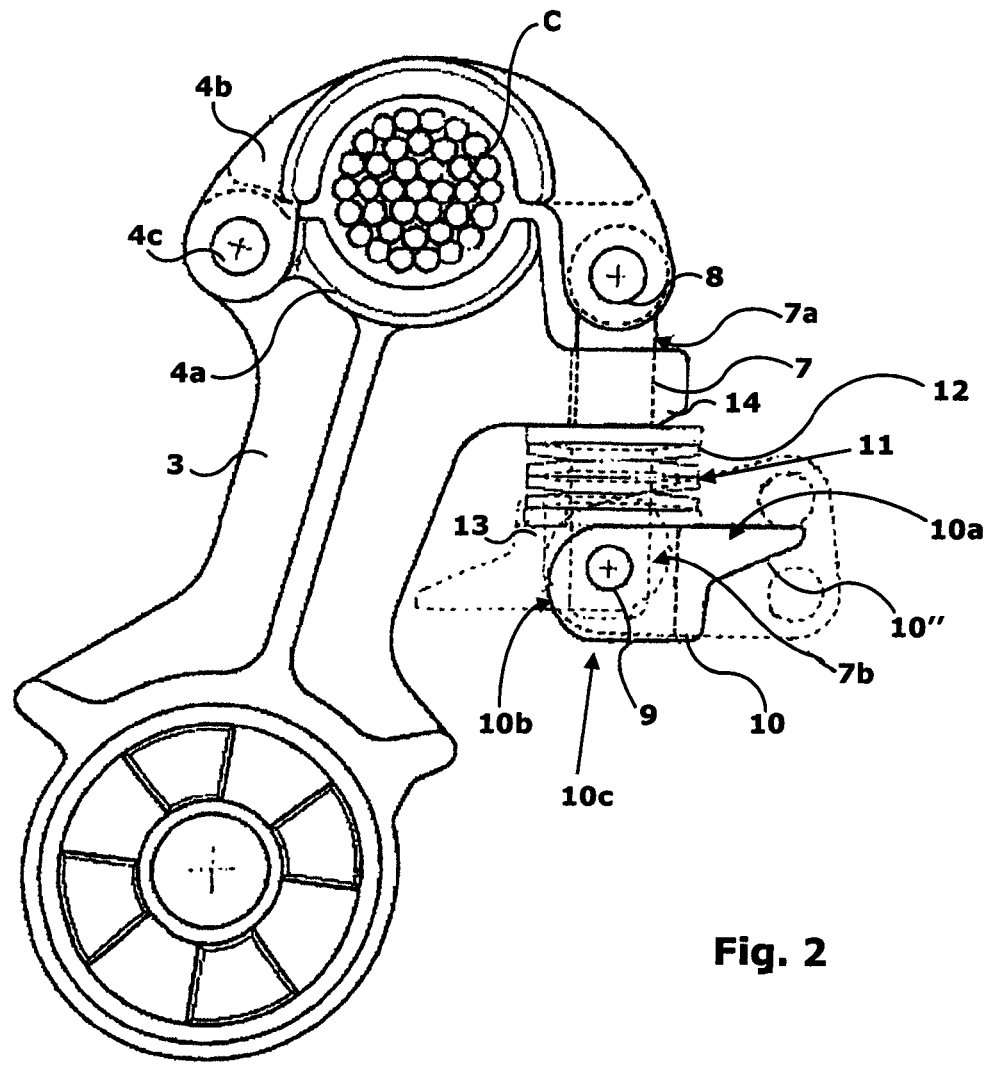
FIG. 2 is a front elevation view of one of the arms of a dampening spacer, with relative anchoring clamp according to the invention.

FIG. 2 and following ones show instead the configuration according to the invention. Oscillating arm 3 has again a first jaw 4a, integral with the free end of arm 3, and a second moving jaw 4b; jaw 4b is mounted oscillating on arm 3, with a rotating end around a pin 4c carried by arm 3, in a position coinciding with a first end of the first jaw 4a. Pin 4c defines an oscillation axis which is parallel to the longitudinal axis of the wire housing seat, defined between the two jaws. The other end of moving jaw 4b, i.e. the tightening end opposite oscillating pin 4c, is apt to cooperate with tightening means.

The two jaws 4a and 4b have a saddle and countersaddle shape, to embrace between them wire C.

According to the invention, the tightening of the two jaws 4a, 4b one on the other, for the fastening on wire C, occurs by means of an eccentric-shaped or cam-shaped lever system, which comprises the following main elements:
- a tie rod 7, which is mounted with a proximal end 7a thereof rotating around a rotation pin 8, carried by jaw 4b at the tightening end on the side opposite pin 4c, and which carries, at the other distal end thereof 7b a constraint pin 9; rotation pin 8 and constraint pin 9 are preferably mutually parallel and also with respect to oscillation pin 4c, even though that is not strictly essential for the purposes of the invention;
- an element of cam lever 10, mounted rotating about above-cited constraint pin 9;
- a pack of Belleville washers 11, mounted freely sliding on tie rod 7, and preferably arranged between two support washers 12, 13 in the way better described here in the following.

More precisely, and according to a preferred embodiment, the pack of Belleville washers 11 consists of an assembly of two pairs of Belleville washers 11, specularly opposite; this term refers to the fact that the washers of each pair are mutually resting with the inner edge thereof, while with the outer edges thereof they rest one pair on the other and respectively against either one of said two retaining washers 12, 13.

Of these, lower washer 13 (lower and upper here refer to the orientation shown in FIG. 2) rests against cam lever 10, and upper washer 12 rests against a fork 14, between the prongs of which part of the length of tie rod 7 is housed. Fork 14 is integral with and projects sideways from oscillating arm 3, on the same side in which tightening end of jaw 4b is found. Since fork 14 is open on the side opposite to oscillating arm 3, tie rod 7 can be introduced between the prongs thereof with a sideway movement, i.e. by the rotation illustrated in the following drawings.

By this arrangement, while upper washer 12 can be considered stationary against fork 14, forming a fixed point, washer 13 can be considered moving, in the sense that it follows the displacement of the cam surface of lever 10 as it is caused to rotate. Lower washer 13 hence moves along tie rod 7 determining the lengthening and shortening movement of the pack of Belleville washers 11.

In order to perform the mounting of clamp 4 on wire C it can be proceeded as schematised in the sequence of FIGS. 3 to 7.

Figure 3:
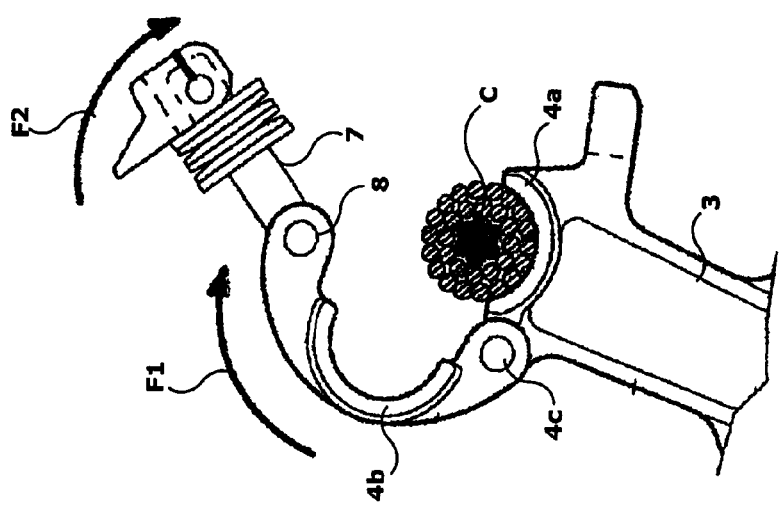
FIG. 3 is a front elevation view of the anchoring clamp of FIG. 2, in an open position, ready for the fastening on a wire of an electric line.

The arrangement of clamp 4a, 4b is such that it can take up—in the initial mounting phase of such clamp on the respective bundle wire C—the open position shown in FIG. 3.

It is immediately evident that an operator can grab arm 3 with a hand, with clamp 4a, 4b open as in FIG. 3; he can hence bring arm 3 and the clamp towards wire C, until housing the wire in the saddle of fixed jaw 4a.

Figure 4:
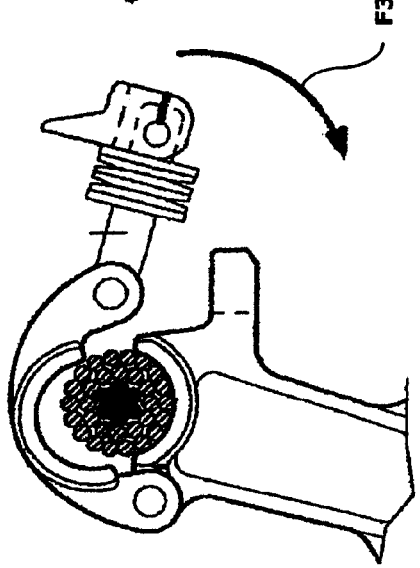

Starting from this position, precisely shown in FIG. 3, the operator can, acting with his other hand, causing moving jaw 4b to rotate about pivot 4c, in the direction of arrow F1, and subsequently cause tie rod 7 to rotate about rotation pin 8 according to arrow F2, until closing second jaw 4b on the wire itself, as shown in FIG. 4.

Figure 8:
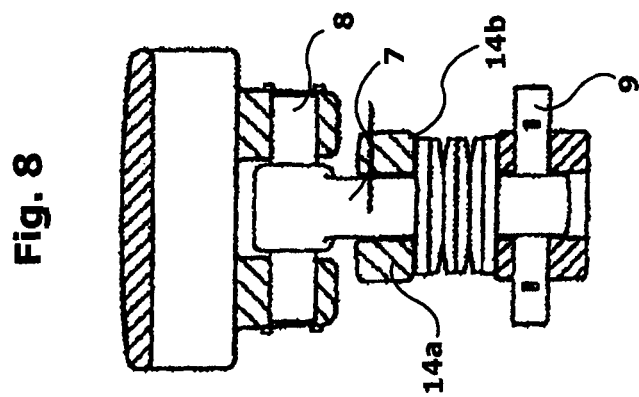
FIG. 8 is a section view, according to trace VIII-VIII of FIG. 5.

In a later step, as shown again in FIG. 4, tie rod 7 is again rotated downwards, as indicated by arrow F3, until bringing it in the position of FIG. 5, i.e. with the tie rod 7 engaged between the two prongs of said fork 14. The two prongs of fork 14 are better visible in FIG. 8 and are referred to as 14a and 14b.

The engagement of tie rod 7 with fork 14, with pack of Belleville washers 11 and washers 12, 13 below the two prongs 14a, 14b of the fork, is facilitated by the fact that in this step spring 11 is loosened and leaves a sufficient clearance of washers 12, 13, between the lower surface of fork 14 and the opposite surface of cam lever 10.

Figure 5:
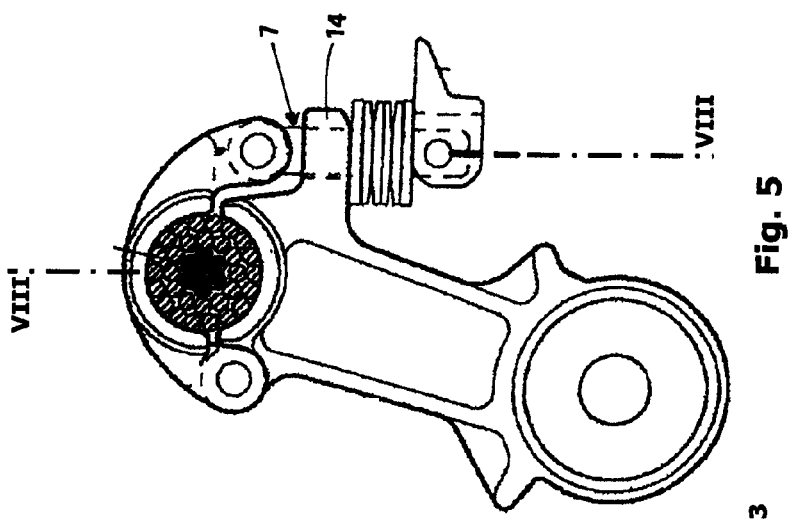
FIGS. 4 to 7 are views fully similar to that of FIG. 3, which represent the clamp in subsequent mounting steps, for the anchoring to the electric line wire.

For such purpose, cam lever 10 is arranged as shown in FIGS. 2 and 5, i.e. with the minimum cam thickness between constraint pin 9 and lower washer 13. Also said otherwise, the cam surface thickness is at a minimum on the longitudinal axis of tie rod 7 in the direction of pin 8.

Figure 6:
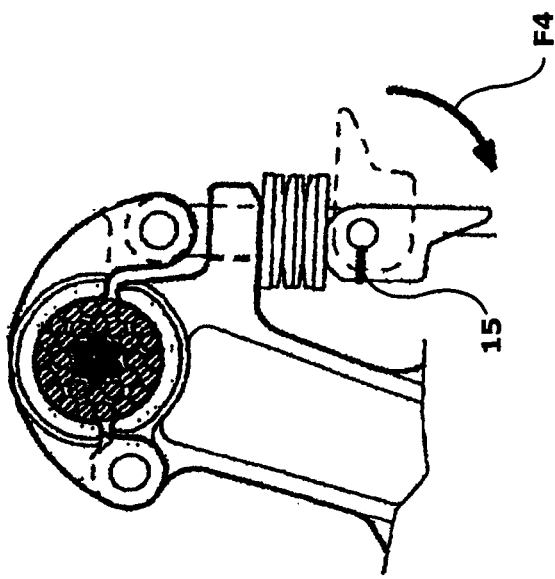

In a subsequent step, as shown in FIG. 6, cam lever 10 is rotated by a quarter of a turn in a clockwise direction with respect to the drawing (direction shown by arrow F4), to accomplish a pre-tightening position of clamp 4. In this condition, the cam surface thickness is at an intermediate distance in the direction of the longitudinal axis of tie rod 7, i.e. towards resting with lower washer 13.

Subsequently, cam lever 10 is rotated by a further quarter of a turn, in the same clockwise direction (direction shown by the arrow F5 of FIG. 7) to accomplish the final tightening position of clamp 4. In this condition, the cam surface thickness is at a maximum in the direction of the longitudinal axis of tie rod 7, i.e. towards resting with lower washer 13.

In fact—as can be clearly detected more in detail in FIGS. 9A, 9B—cam lever 10 has a cam profile the points of which are at an increasingly growing distance from the centre of rotation of constraint pin 9, with mixtilinear development.

More precisely, and according to a particularly important feature of the invention, these points form a first rectilinear portion 10a, which is at a minimum distance from the axis of pin 9, a second rectilinear portion 10b, perpendicular to portion 10a and which is at an intermediate distance from the axis of pin 9, and a third rectilinear portion 10c, parallel and opposite to portion 10a and which is at a maximum distance from the axis of pin 9; these rectilinear portions are connected by curve portions 10d and 10e, the points of which are at increasingly growing distances from the axis of pin 9.

Even more precisely, the first rectilinear portion 10a, being at a minimum distance from the axis of pin 9, nevertheless is at such a distance from the opposite rotation pin 8 (and hence, indirectly, from the resting point of washer 12 to fork 14) as to leave a certain sliding clearance of Belleville washer 11 along tie rod 7. This clearance is sufficient to allow—in the passage from the free position of FIG. 4 to the tightening position of FIG. 5—the engagement of the pack of Belleville washers 11 and relative washers 12, 13, below the prongs of fork 14.

The second rectilinear portion 10b, having an average distance from the axis of pin 9, is such as to cancel said sliding clearance, or better, to produce a slight tightening of Belleville washers 11. In these conditions, the two jaws are closed on the wire and the mounting of the clamp is temporarily stable.

The third rectilinear portion 10c, being at a maximum distance from the axis of pin 9, produces a forced tightening of Belleville washers 11.

These rectilinear portions 10a, 10b, 10c, have the function of defining stable resting planes for the lower washer 13 of the Belleville washers, in each one of the chosen positions, without running the risk that, in the growing tightening manoeuvres of clamp 4, cam lever 10 can be halted in intermediate positions of possible instability.

This arrangement is hence such that, when washer 13 lies resting on surface 10a, between washer 12 and fork 14 there is sufficient clearance to allow—as already mentioned—easy entry of tie rod 7 into fork 14 (passage from the position of FIG. 4 to that of FIG. 5).

When washer 13 lies resting on surface 10b (passage from the position of FIG. 5 to that of FIG. 6), not only said clearance is fully absorbed, but rather spring 11 is slightly loaded. This position—called pre-tightening position—enables the operator to verify that arm 3 and clamp 4 lie in a correctly registered position on wire C and, if necessary, it allows to return shortly in the loose position of FIG. 5 for a better position registration.

Finally, when washer 13 lies resting on surface 10c (passage from the position of FIG. 6 to that of FIG. 7), Belleville washers 11 are compressed to the desired extent to supply, according to the design, the desired tightening load of the clamp, meant to ensure the maintenance of the spacer in the position provided for the entire lifetime of use of the spacer.

It is important to notice here that the use of a pack of Belleville washers represents a fundamental feature of the present invention, which provides significant advantages over other configuration choices. In fact:
  the displacement travel of tie rod 7, to move from the loosened position of FIG. 5 to the compressed position of FIG. 7, can be kept relatively short, compatibly with the accurate tightening of the wire, due to the great tightening force of the Belleville washers;
  a short displacement travel also allows to accomplish an actuation by cam, while other elastic elements would require a more complex actuation mode;
  Belleville washers easily accept protection treatments against aggressive atmospheric agents (such as for example mechanic zincing).

Cam lever 10 so far has been described as if it consisted of an essentially flat element, having a shaped contour comprising mixtilinear manoeuvring profile 10a, 10b, . . . 10e as well as a manoeuvring appendix 10" by means of which one can intervene to cause the rotation thereof. In actual fact, and as shown in FIG. 9B, cam lever 10 in turn is preferably shaped as fork body 15, having two prongs 15a, 15b, each of which is shaped with the already described mixtilinear profile and a common, widened base 15c, forming a manoeuvring appendix, which is of a suitable size for a more secure grip by one's hand.

FIG. 9A furthermore clearly shows a notch 10' which marks the planar portion 10c of the cam surface; for greater visibility this notch can be filled with a bright colour, such as red. This mark is very useful—as shown by FIGS. 5, 6 and 7—to give a clearly visible indication of the position of cam lever 10, i.e. to indicate the positions of loose clamp (FIG. 5), pre-tightened clamp (FIG. 6) and clamp in final tightening (FIG. 7).

In FIG. 2 and in FIG. 9 it is clearly visible that cam body 10 extends into an appendix 10" or 15c, forming a lever arm. It must be pointed out that the length of this lever arm 10", 15c is modest because, on the one hand, cam body 10 is meant, of course, to remain in position during the entire lifetime of the spacer, and it is hence useful for it to have a limited protrusion in order not to be a trigger point of electric discharges; on the other hand, it is meant to allow only the rotation manoeuvre from the loosened position of FIG. 5 to the pre-tightening position of FIG. 6, which manoeuvre the operator can easily perform with no particular effort.

Figure 7:
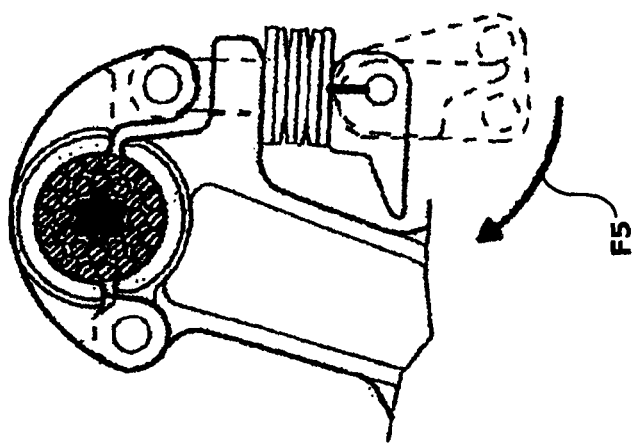

Conversely, the rotation from the position of FIG. 6 to the tightening position of FIG. 7, taking into account the strong resistance offered by Belleville washers 11 in this step, cannot be overcome by a simple manual action; that is of course desired, since it is unthinkable—from the point of view of the safety of the electric power transmission plant—that a spacer may be left in a condition easily detachable with a more or less limited effort.

For this reason, in order to cause cam lever 10 to rotate towards the final tightening position, shown in FIG. 7, the use of a manoeuvring wrench is provided like the one shown in FIGS. 10A, 10B and 10C.

In the top plan view of FIG. 10A one can see that the wrench comprises a shaft 16, with which an actuation bar 17 is integral with on one side and a fastening plate 18 is integral with on the other side. Of the two views of FIG. 10B in elevation front view and of FIG. 10C in elevation side view, one can see that from this plate 18 two different-length gripping pegs 19, 20 project, in a direction opposite to that of shaft 16, parallel to shaft 16, for the function better described here in the following. The two pegs 19, 20 are arranged at a short angular distance one from the other and at a certain distance from the axis of shaft 16, i.e. at a distance of the same order of magnitude as the extent of appendix 10" 15c with respect to the hole of pin 9.

In fact, in order to control the final rotation of cam lever 10, the shaft 16 of the manoeuvring wrench is brought into alignment with the pin 9 of cam 10 and gripping pegs 19 and 20 are arranged on both sides of the appendix 10" of cam 10. Thereby the manoeuvring wrench is engaged with cam 10, at least in the direction of a rotation about the axis of pin 9 (as represented by the interrupted line in FIG. 7) so that, forcing with the two hands simultaneously on the ends of bar 17, one can move cam 10 according to arrow F5, compressing Belleville washers 11 up to the set calibrated measure.

The lever arm by which bar 17 can be moved is remarkably larger than the one existing between the two gripping pegs 19, 20 and the rotation axis of shaft 16 (coinciding, in the working phase, with the axis of rotation of cam 10), which allows to cause cam 10 to rotate—for the final tightening of the clamp (or possibly also to open it)—by about 90° in the direction indicated by arrow F5, with relative ease and low effort by the operator. On the other hand, even having to act with effort, the operator does not risk moving the spacer, which is already kept in a correct position by the pre-tightening action provided for the position of FIG. 6.

In addition to that, due to the very nature of the system, clamp tightening occurs in a necessarily even manner for all line spacers, with evident advantages also from the point of view of line duration, of the maintenance of the relative mechanical features and also of the reduction of maintenance actions.

The present invention hence proposes a mounting system of the spacers and of the dampening spacers, the working principle of which differs completely from the known solutions precisely due to the fact that no parts to be assembled on site are used, such as nuts and bolts. In other words, the invention has reached the result of no longer relying on—for the purpose of a correct tightening of the spacer clamps on the wire—the manipulation and assemblying of detached parts, which can pose a problem to an operator, who operates in extremely critical working conditions as are—as known—his suspended position from personal safety equipment at great heights.

However, it is understood that the invention must not be considered limited to the particular arrangement illustrated above, which is only an exemplifying embodiment thereof, but that a number of variants are possible, all within the reach of a skilled person in the field, without necessarily departing from the scope of protection of the invention, as defined by the following claims.

The invention claimed is:

1. Tightening clamp for the fastening to wires of high-voltage electric lines, of the type comprising: at least one arm (3) for the fastening to the wires (C), at a free end of which a first fixed jaw (4a) is fastened, with which a second jaw (4b) is movingly coupled by a disengageable tightening means, both jaws being provided with opposite saddles for the housing of the wires (C), characterised in that said second moving jaw (4b) has a first end mounted rotating on a pin (4c), carried by said fastening arm (3) in a position coinciding with a first end of the first jaw (4a), while with a second end it is apt to cooperate with tightening means, and in that said tightening means comprise a tie rod (7) having a proximal end (7a) mounted rotating on the second end of the second jaw (4b) and a distal end (7b) constrained by means of a constraint pin (9) to a cam lever (10), elastic means in the shape of at least one Belleville washer (11) being mounted on said tie rod and arranged so as to lie between said cam lever (10); a fixed abutment element (14) projecting from said fastening arm (3); and a spacer for bundle-shaped wires of a high-voltage electric line, of the type comprising a rigid central body, whereon at least two arms are mounted (3) for the fastening to the bundle wires (C), at the free end of each arm (3) and a clamp (4) for the anchoring to a respective wire (C).

2. Tightening clamp as claimed in claim 1, characterised in that said elastic means consist of an assembly of at least two specularly opposite pairs of Belleville washers (11).

3. Tightening clamp as claimed in claim 1, characterised in that said elastic means are mounted freely sliding on the tie rod (7) and lying between two resting washers (12, 13) meant to rest against said fixed abutment element (14) and against the shaped surface of said cam lever (10), respectively.

4. Tightening clamp as claimed in claim 1, wherein said fixed abutment element consists of prongs of a fork (14) projecting from the fastening arm (3).

5. Tightening clamp as claimed in claim 1, characterised in that said cam lever (10) is mounted rotating on a pin (9) carried by the distal end (7b) of the tie rod (7) and having a cam surface, whereon said elastic means rest (11), said cam surface being shaped with a mixtilinear profile (10a, 10b, . . . 10e).

6. Tightening clamp as claimed in claim 5, characterised in that said mixtilinear profile of the cam (10) comprises at least two planar portions of resting surface of said elastic means (11), one portion (10b) representing a point of minimum and the other portion (10c) representing a point of maximum.

7. Tightening clamp as claimed in claim 6, characterised in that said mixtilinear profile of the cam (10) comprises a third intermediate planar portion of resting surface, which determines a slight compression of said elastic means (11) apt to stabilise the closure of the clamp.

8. Clamp as claimed in claim 7, wherein said planar portions (10a, 10b, 10c) are connected by curved portions (10d, 10d).

9. Tightening clamp as claimed in claim 1, characterised in that said cam lever (10) is shaped as a fork body (15) having two prongs (15a, 15b), each one provided with a cam-shaped surface, said prongs being connected in an appendix (10", 15c) forming a common actuation base.

10. Kit for the installation of a spacer as claimed in claim 1, characterised in that it comprises a maneuvering wrench (16-20), consisting of a shaft (16), with which an actuation bar (17) is integral on one side and a platelet (18) is integral on the other side, said platelet (18) supporting two gripping pegs (19, 20), parallel to and offset with respect to said shaft (16) and meant to engage with said appendix (10", 15c) of the cam lever (10, 15) in a final tightening step.

* * * * *